(12) United States Patent
Kobayashi et al.

(10) Patent No.: US 7,493,435 B2
(45) Date of Patent: Feb. 17, 2009

(54) OPTIMIZATION OF SMI HANDLING AND INITIALIZATION

(75) Inventors: Grant H. Kobayashi, Beaverton, OR (US); Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 10/681,446

(22) Filed: Oct. 6, 2003

(65) Prior Publication Data

US 2005/0086547 A1   Apr. 21, 2005

(51) Int. Cl.
G06F 13/24    (2006.01)
(52) U.S. Cl. .................. 710/260; 710/269
(58) Field of Classification Search ........... 710/260, 710/269, 8, 261, 14, 267; 709/318; 711/163, 711/170; 712/31; 713/310, 1, 300, 323, 713/2, 100, 324; 707/10; 714/726; 455/418; 718/100
See application file for complete search history.

(56) References Cited

U.S. PATENT DOCUMENTS

| | | | |
|---|---|---|---|
| 5,530,891 A * | 6/1996 | Gephardt .................. 710/8 |
| 5,613,071 A * | 3/1997 | Rankin et al. ............... 707/10 |
| 5,761,516 A | 6/1998 | Rostoker et al. |
| 5,768,585 A * | 6/1998 | Tetrick et al. ................. 713/2 |
| 5,938,765 A * | 8/1999 | Dove et al. ................... 713/1 |
| 5,978,903 A * | 11/1999 | Quimby et al. ............. 712/229 |
| 5,996,058 A | 11/1999 | Song et al. |
| 6,065,121 A * | 5/2000 | Hobson et al. ............. 713/300 |
| 6,158,000 A * | 12/2000 | Collins ......................... 713/1 |
| 6,192,442 B1 * | 2/2001 | Haren et al. ............... 710/269 |
| 6,237,120 B1 * | 5/2001 | Shimada et al. ........... 714/726 |
| 6,272,618 B1 * | 8/2001 | Tyner et al. ................... 712/31 |
| 6,282,601 B1 * | 8/2001 | Goodman et al. ........... 710/260 |
| 6,308,278 B1 * | 10/2001 | Khouli et al. ............... 713/323 |
| 6,374,338 B1 * | 4/2002 | Garvey ........................ 711/170 |
| 6,446,213 B1 * | 9/2002 | Yamaki ....................... 713/323 |

(Continued)

FOREIGN PATENT DOCUMENTS

EP      0 720 094 A2    7/1996

(Continued)

OTHER PUBLICATIONS

Kobayashi, et al. U.S. Appl. No. 10/307,146, Filed Nov. 30, 2002, "Apparatus and Method for Multi-Threaded Processors Performance Control," 36 pages.

*Primary Examiner*—Glenn A Auve
*Assistant Examiner*—Trisha Vu
(74) *Attorney, Agent, or Firm*—David P. McAbee (57) ABSTRACT

A method and apparatus for efficient memory allocation and system management interrupt (SMI) handling is herein described. Upon waking a second processor in a multiple processor system, one may use a single SMI to initialize each processor, may use the location of a single default SMI handler as a wake-up vector to the second processor, and may patch an instruction pointer to a non-aligned address during the handling of the SMI with the second processor to forgo the traditional extra aligned memory allocation. In addition, one may use unified handler code to handle software generated SMIs on both the first and second processors and may use exit SMM directly after handling a hardware SMI to save execution time.

53 Claims, 9 Drawing Sheets

U.S. PATENT DOCUMENTS

| | | | |
|---|---|---|---|
| 6,611,911 B1 * | 8/2003 | O'Shea et al. | 713/1 |
| 6,615,329 B2 * | 9/2003 | Scott et al. | 711/163 |
| 6,711,642 B2 * | 3/2004 | Huang | 710/260 |
| 6,775,734 B2 * | 8/2004 | Chang | 711/2 |
| 6,782,472 B2 * | 8/2004 | Jain et al. | 713/2 |
| 6,792,480 B2 * | 9/2004 | Chaiken et al. | 710/14 |
| 6,836,849 B2 * | 12/2004 | Brock et al. | 713/310 |
| 6,842,857 B2 * | 1/2005 | Lee et al. | 713/2 |
| 6,848,046 B2 * | 1/2005 | Zimmer | 713/100 |
| 6,925,556 B2 * | 8/2005 | Hill et al. | 713/2 |
| 6,968,410 B2 * | 11/2005 | Bennett et al. | 710/260 |
| 6,968,412 B1 * | 11/2005 | Nalawadi | 710/261 |
| 7,043,729 B2 * | 5/2006 | Lewis | 718/103 |
| 7,146,515 B2 * | 12/2006 | Harrington et al. | 713/324 |
| 7,152,169 B2 * | 12/2006 | Cooper et al. | 713/320 |
| 2002/0099893 A1 * | 7/2002 | Nguyen et al. | 710/260 |
| 2003/0009654 A1 * | 1/2003 | Nalawadi et al. | 713/1 |
| 2003/0093579 A1 * | 5/2003 | Zimmer et al. | 709/318 |
| 2003/0224768 A1 * | 12/2003 | Adjamah | 455/418 |
| 2004/0034854 A1 * | 2/2004 | Cottrell | 718/100 |

FOREIGN PATENT DOCUMENTS

| | | |
|---|---|---|
| EP | 0 817 038 A2 | 1/1998 |
| EP | 0 818 736 A2 | 1/1998 |
| GB | 2 382 180 A | 5/2003 |

* cited by examiner

OPTIMIZATION OF SMI HANDLING AND INITIALIZATION

FIELD

This invention relates to the field of computer systems and, in particular, to system management mode optimizations.

BACKGROUND

Computer systems are becoming increasingly pervasive in our society including everything from small handheld electronic devices, such as personal digital data assistants and cellular phones, to application-specific electronic components, such as set-top boxes and other consumer electronics, to full mobile, desktop, and server systems. However, as systems become smaller in size and in price, the need for efficient memory allocation and system management becomes more important.

Server systems have been traditionally characterized by a significant amount of conventional memory and multiple physical processors in the same system (a multiprocessor system), wherein a physical processor refers to a single processor die or single package. The significant amount of memory available to a server system has lead to extremely inefficient allocation of memory space and wasted execution time.

Typically, in a multi-processor system, upon boot every processor arbitrates for wake-up, which may include allocating memory and relocating the processor's base address (SM-Base). In the process of initializing each processor, a system management interrupt (SMI) is generated, which is handled with a default SMI handler for each processor. Usually, the processors arbitrate with a race to the flag scheme, wherein the first processor to begin handling the SMI is able to begin initialization. Initialization typically includes allocation of a separate and distinct 4 kB aligned memory space for each processor, which forces one to allocate more memory than needed for system management.

Furthermore, when a system management interrupt (SMI) occurs, whether during boot or regular operation, each processor in a multiprocessor system runs a separate and distinct SMI handler to service/handle the SMI. There are two types of SMIs. The first type is an asynchronous interrupt that may be generated by the system hardware, such as when a battery is low. An asynchronous interrupt may be handled separately by any processor, since knowledge of another processor's save state area is not needed to service the request. The second type of interrupt, a synchronous SMI, that is software generated, should be handled by every processor. Typically, a software generated SMI occurs when the operating system (OS) wants a processor to enter system management mode (SMM). SMM is an environment for executing software routines/handlers that does not interfere with the OS or application programs.

In current multiprocessor systems, each processor enters SMM and then one-by-one executes a distinct SMI handler to check their registers to find out which processor generated the SMI. This requires a separate SMI handler be executed for each processor, which introduces resource contention issues, thus making updates to the SMI handler code difficult.

However, these inefficient methods of initialization and handling are not limited to multiprocessor server systems, but exist in other systems, such as mobile multiprocessor systems. Hyper-Threading Technology (HT) is a technology from Intel.RTM. Corporation of Santa Clara, Calif. that enables execution of threads in parallel using a single physical processor. HT incorporates two logical processors on one physical processor (the same die). A logical processor is an independent processor visible to the operating system (OS), capable of executing code and maintaining a unique architectural state from other processor in a system. HT is achieved by having multiple architectural states that share one set of execution resources.

Therefore, HT enables one to implement a multi(logical) processor system in a mobile platform. As shown above, inefficient memory allocation, processor initialization, and SMI handling exist in traditional multiprocessor systems, such as server systems. Furthermore, as multiprocessor systems begin to infiltrate the mobile realm, where resources such as memory are limited, the need for optimizations of the aforementioned inefficiencies becomes even more important.

BRIEF SUMMARY

A method and apparatus for efficient memory allocation and system management interrupt handling is herein described. In one embodiment, a single SMI is used to initialize each processor in a multi-processor environment. In addition, a location of a default SMI handler may be used as a wake-up vector to inactive processors to efficiently utilize memory. In another embodiment, unified handler code is executed on multiple processors to handle software generated SMIs.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific memory addresses, memory sizes, and component configurations in order to provide a thorough understanding of the present invention. It will be apparent, however, to one skilled in the art that these specific details need not be employed to practice the present invention. In other instances, well known components or methods, such as routine boot-up blocks (e.g. power on self-test (POST)), specific system management mode (SMM)

implementation, and specific system management interrupt handler code have not been described in detail in order to avoid unnecessarily obscuring the present invention.

The method and apparatus described herein are for optimization of memory allocation when waking a processor and optimization of system management interrupt (SMI) handling in multiprocessor systems. The method of waking a processor may occur as a result of any number of normal operations. For example, when the computer is powered on or reset, one may wake an inactive/sleeping processor. Furthermore, when a system is returning from a low power state, such as sleep, standby, suspend, hibernation, wait-for-SIPI, sleep, deep sleep, reset, or any other mode where the second processor does not respond to interrupts one may wake an inactive processor.

It is readily apparent to one skilled in the art, that the method disclosed for waking a second processor may be applicable to any level computer system (personal digital assistants, mobile platforms, desktop platforms, and server platforms), as well as any number of processors. For example, a multiprocessor system with four or more processor may use this method to wake an inactive processor with an active processor.

Figure 1:
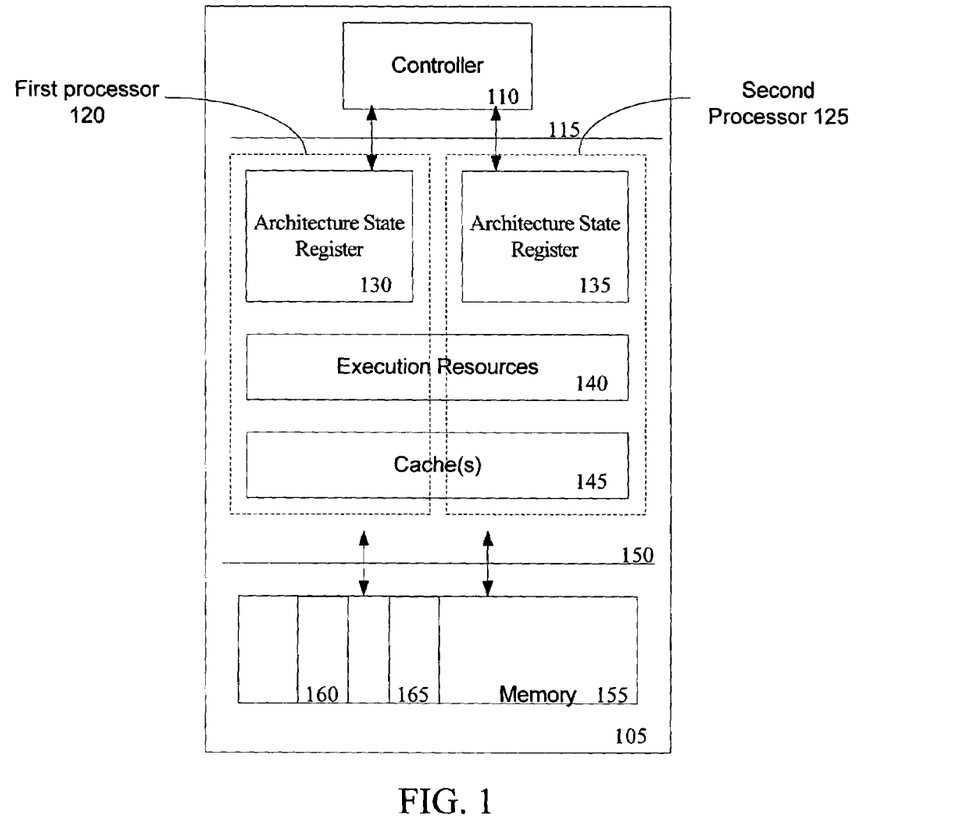
FIG. 1 illustrates a block diagram of a device with multiple processors that share execution resources, caches, and memory.
Figure 2:
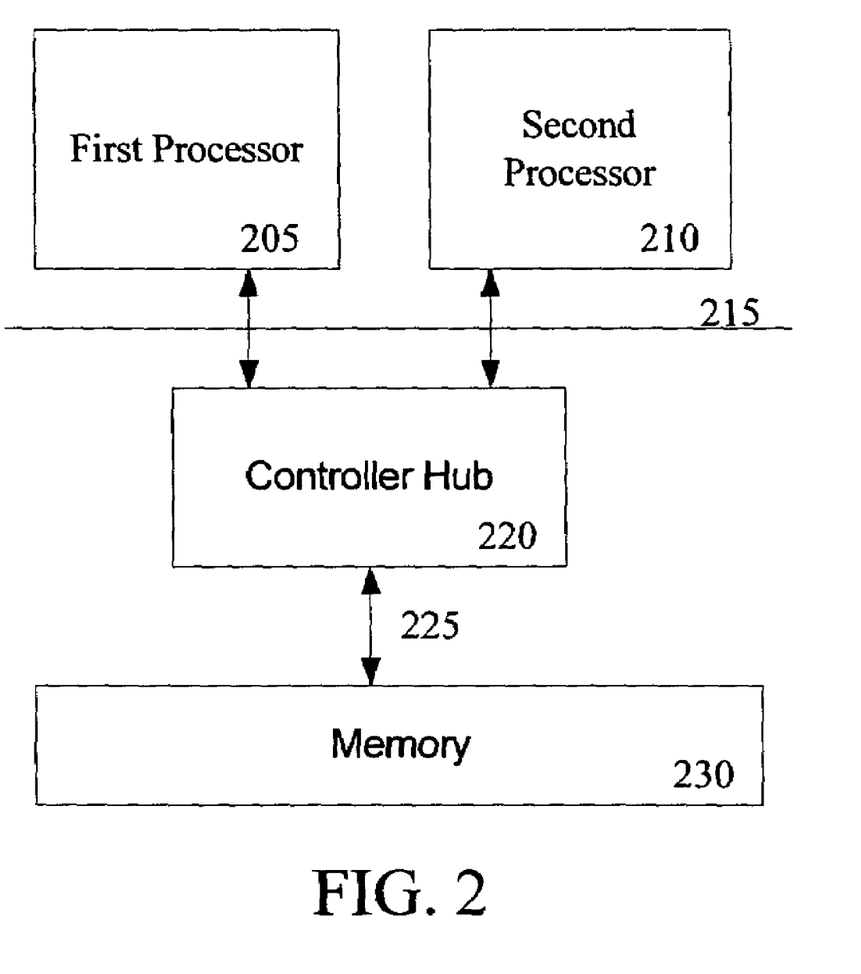
FIG. 2 illustrates a block diagram of a system with multiple processors.
Figure 3:
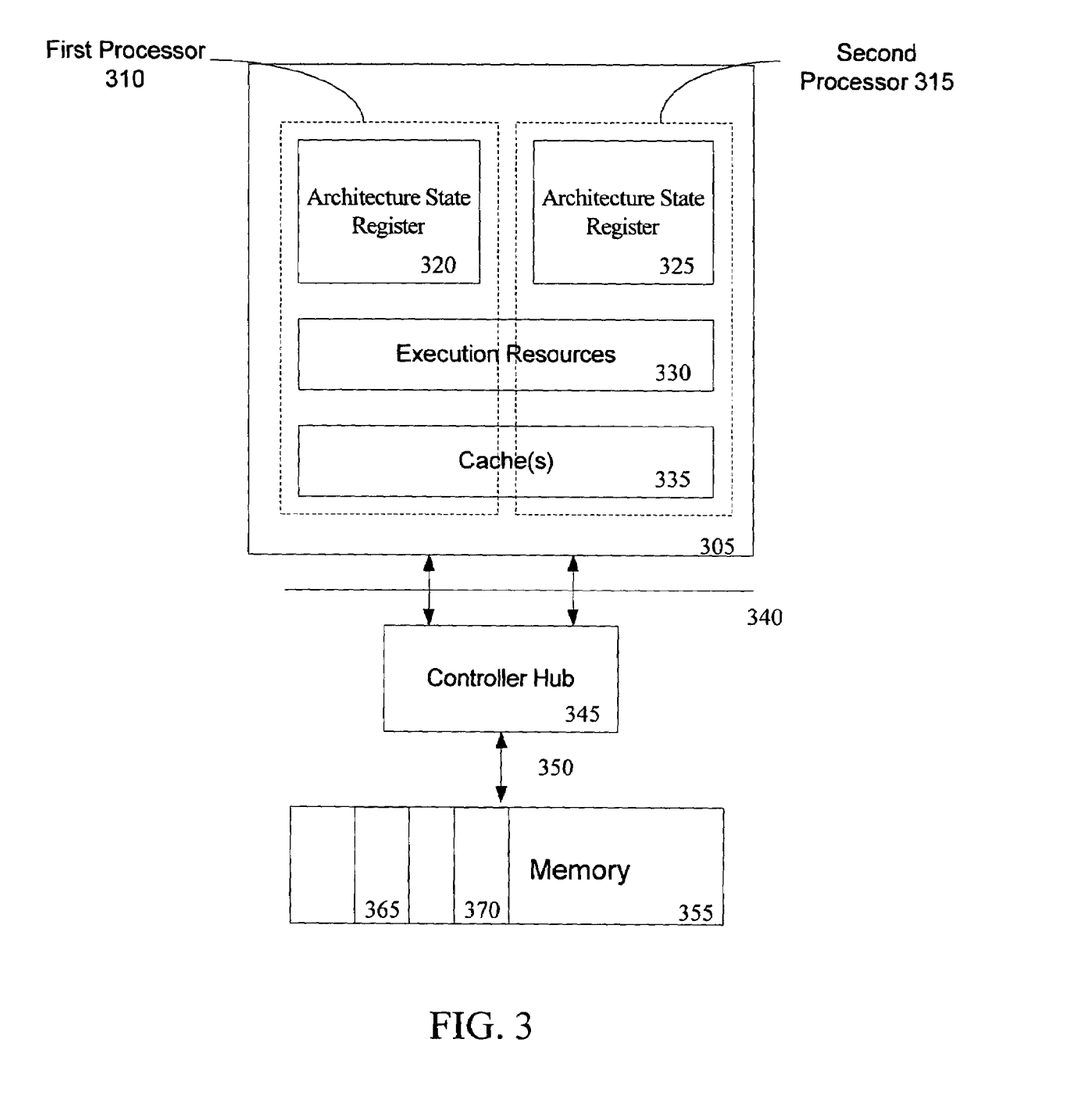
FIG. 3 illustrates a block diagram of a system with a physical processor having multiple logical processors.

FIGS. 1-3 depict illustrative examples of some hardware that may embody the methods described herein. The methods described may be used in any multiprocessor system; therefore, the methods will only be described in reference to FIG. 3 as not to obscure the invention with unnecessary detail.

FIG. 1 illustrates a block diagram of a device 105 with multiple logical processors. A physical processor refers to a physical processor die or a single package. A logical processor is an independent processor visible to the operating system (OS), capable of executing code and maintaining a unique architectural state from other processor in a system. Hyper-Threading Technology (HT) is a technology from Intel.RTM. Corporation of Santa Clara, Calif. that enables execution of threads in parallel using a single physical processor. HT includes two logical processors on one physical processor and is achieved by duplicating the architectural state, with each architecture state sharing one set of processor execution resources.

Device 105 may include a first processor 120 and a second processor 125. Device 105 may be a physical processor. Device 105 may also be an embedded system or other device having at least two processors. Processors 120 and 125 may be logical processors. For example, processor 105 may include architecture state registers 130 and 135 that each holds a unique architecture state. It is readily apparent that device 105 may include more than two logical processors that each have an architecture state register associated with it to hold a separate architecture state. The two processors 120 and 125 share the same execution resources 140, caches 145, busses 115/150, and memory 155.

Device 105 may also include controller 110. Controller 110 may be an Advanced Programmable Interrupt Controller (APIC) controller. Controller 110 may be used to generate a system management interrupt (SMI). Controller 110 may also be used to communicate on an APIC bus, which is not depicted, coupling the first processor 120 and the second processor 125 together.

Device 105 may also include memory 155. Memory may be any style of storage, wherein data may be stored. For example, memory 155 may be registers to store information. Memory 155 may also be another level of cache 145. Memory 155 may also be a form of system memory placed on device 105.

Memory 155 has at least a first memory location 160 and a second memory location 165. First memory location 160 may contain default system management handler code. First memory location 160 may also be 1 k aligned. Second memory location 165 may be another non-1 k aligned address. First memory location 160 and second memory location 165 may also be base addresses for a first processor 120 and second processor 125 respectively. Second memory location 165 may also be used as temporary storage space, when relocating first processor 120's base address. The first and second memory locations will be discussed in more detail in reference to the methods described in FIGS. 4-9.

Turning to FIG. 2, an illustrative example of a system with multiple processors is depicted. The system may include first processor 205 and second processor 210. Processor 205 and 210 may be physical processors, wherein each processor is in its own package. The system may also include system bus 215 to couple processors 205 and 210 to controller hub 220. Controller hub 220 may also be coupled to memory 230 by a bus 225.

FIG. 3 illustrates an example of a system with multiple processors. Processor 305 may include processor 310 and processor 315, which share execution resources 330, cache 335, and system bus, 340. Architecture state registers 320 and 325 hold the unique architecture state of processors 320 and 325 respectively. System bus 340 couples processor 305 to controller hub 345. Controller hub 345 may be coupled to system memory by a second bus 350. System memory may have multiple memory locations, such as first memory location 365 and second memory location 370.

FIG. 3's illustrative system will be used to describe the methods depicted in FIG'S. 4-9. Although FIG. 3 is being referred to in describing the methods of efficient memory allocation and system management interrupt (SMI) handling, it is readily apparent that the hardware in FIG. 1, FIG. 2, and other hardware configurations not depicted may implement the methods describe herein.

Figure 4:
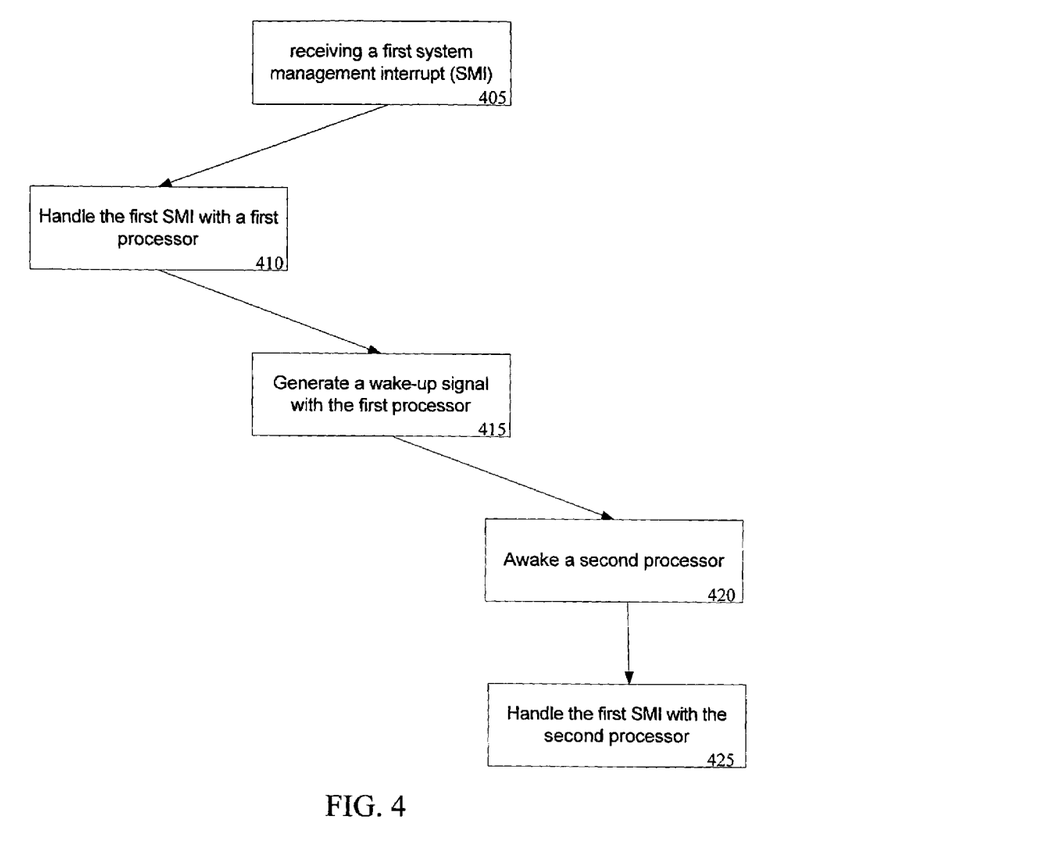
FIG. 4 illustrates a flow diagram of a first processor waking a second processor.

FIG. 4 illustrates a high-level flow diagram of a first processor waking a second processor. The first and second processors may be logical processors located on one processor die, separate processors located on separate packages as shown in FIG. 2, or processors in other multiprocessor configurations. Initially, when a multiprocessor system comes out of a low power state, such as sleep, standby, suspend, hibernation, wait-for-SIPI, sleep, deep sleep, reset, or any other mode where the second processor does not respond to interrupts a first processor should initialize to an active state, while a second processor should initialize to an inactive state. An active state may include executing code or responding to interrupts. In the alternative, an inactive state may include not responding to interrupts. An inactive state may also include not executing code.

In block 405, a first system management interrupt (SMI) is received. Often a SMI is generated to request a service from a processor. Once an SMI is received, a processor enters system management mode (SMM) to service the request by running SMI handler code and routines in conventional memory, unless the processor is inactive and not responding to interrupts.

As an illustrative example, the first SMI in block 405 may be generated by a controller hub, such as controller hub 345 depicted in FIG. 3. As another example, the first SMI in block 405 may be generated by an APIC, such as controller 110 in FIG. 1, or by a controller located separately in the system (not depicted). As yet another example, the first SMI in block 405 may be generated by changing the logic level of a pin on a processor, such as processor 305 or a controller hub, such as controller 345.

The first SMI in block 405 may be a service request to initialize SMM, to allocate address space for system management, and/or to relocate a processors base address (SMBase). The SMBase may be the address where the system management portion of memory begins. The SMBase may also be the address where the system management portion of memory is referenced from. For example, the SMBase may be a value of 0x30000. The SMI handler for that portion of memory might be referenced to the SMBase by an offset. For example, the SMI handler may be offset from the SMBase by 0x8000 (SMBase+0x8000), which would put the SMI handler at 0x38000 in the example.

When the SMI is generated in a multiprocessor system both a first processor and a second processor should receive/latch the SMI. However, the second processor may not enter SMM and handle the SMI at this time, since it may be in an inactive state (not responding to interrupts). In contrast, in block 410, the first processor may be active and may handle the first SMI received in block 405. When the first SMI is received by the first processor, the first processor may enter system management mode (SMM) to service/handle the SMI.

Figure 5:
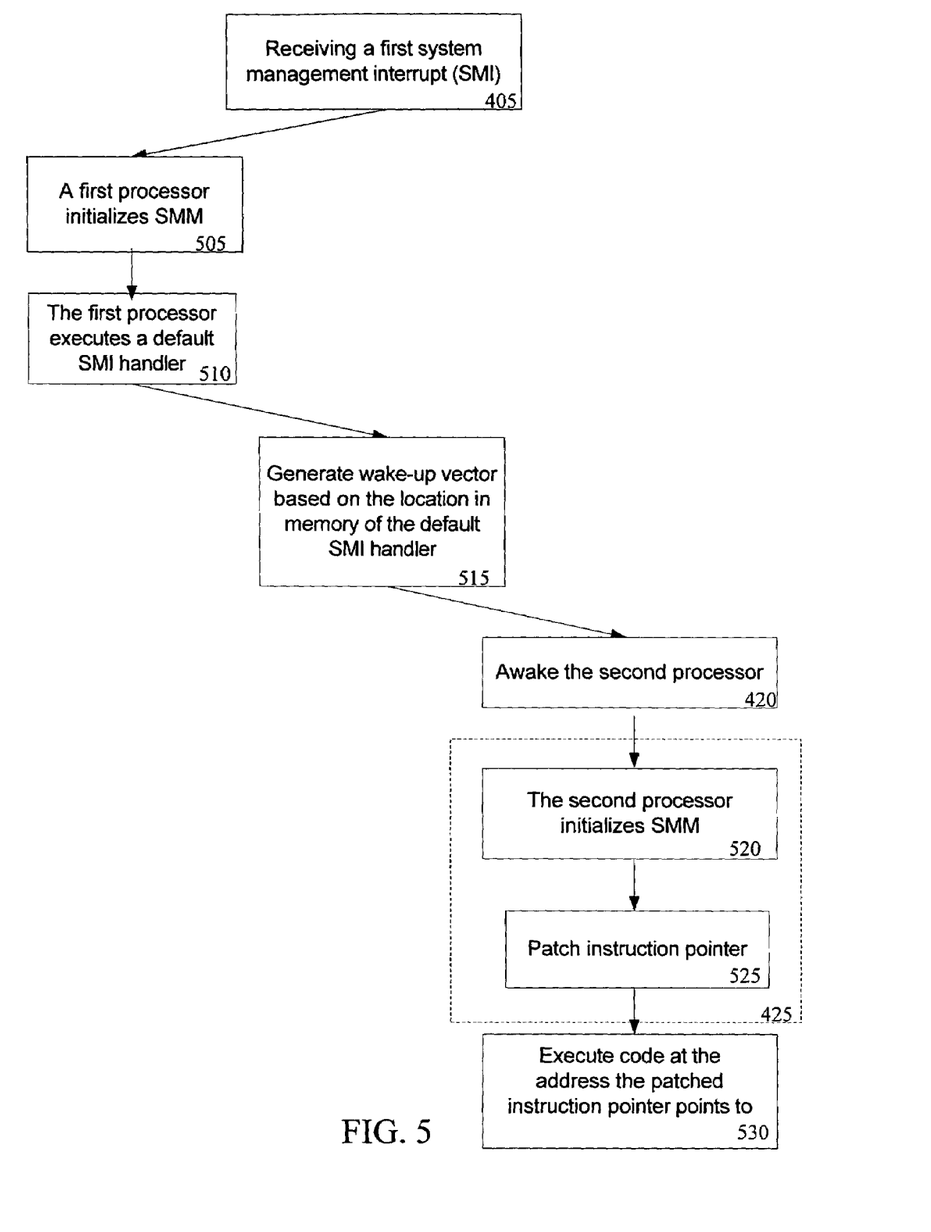
FIG. 5 depicts a flow diagram of an illustrative embodiment for waking a second processor with a first processor.

As shown in FIG. 5, the first processor may handle the SMI by initializing SMM in block 505 and executing a default SMI handler in block 510. The default SMI handler may be default code located at a default memory location, such as first memory location 365. The first memory location may be 1 k, 4 k, or any other aligned memory range.

Returning to FIG. 4, a wake-up signal is generated by the first processor in block 415. The wake-up signal in block 415 may be any signal that is sent to wake the second processor from an inactive state. Since the second processor may not be responding to interrupts or executing code in an inactive state, the wake-up signal may be a bus signal that the second processor, in an inactive state, waits for to begin the waking process. In one embodiment, the wake-up signal may be a startup inter processor interrupt (SIPI) message transmitted on a bus (not depicted), such as an APIC bus, that couples the first and second processors.

As depicted in FIG. 5 in block 515, the wake-up signal may be a vector that is based on the location in memory of a default SMI handler. The wake-up signal may be any address in memory or any reference to an address location in memory. In one embodiment, the default SMI handler is located at first memory location 365, wherein the wake-up signal is a vector based on first memory location 365. In another embodiment, the wake-up signal is based on the first memory location 365, which is a 1 k, 4 k, or other aligned memory address range. The second processor may require that the wake-up signal be aligned and be in conventional system memory. In yet another embodiment, first memory location 365 may be the address location where second processor 315 begins execution.

Turning back to FIG. 4, block 420 shows the second processor waking. Block 420 may include waking the second processor to allow it to handle the first SMI received in block 405, or running basic wake-up routines, such as a power on self test (POST).

In the next block, block 425, the first SMI received in block 405, is handled by the second processor. Although, the second processor may have been inactive when first SMI in block 405 was received, and therefore, unable to service the SMI at that time; the second processor may still have latched the SMI when it was in an inactive state. Once awake, the second processor may handle the first SMI that was previously latched.

Moving to FIG. 5, one embodiment of handling the first SMI with the second processor is illustrated in blocks 520 and 525. In block 520, the second processor initializes SMM. Additionally, in block 525 an instruction pointer for the second processor may be patched to a second memory address, such as second memory address 370 in FIG. 3. Second memory address 370 may be a non-aligned address no longer confined to conventional memory. Once the second processor patches the instruction pointer to second memory address 370, it is not necessary to allocate the conventional aligned memory for executing startup code. After finishing initialization and resuming, the second processor, as shown in block 530, may resume to the patched instruction pointer, which points to second memory address 370, and begin executing its startup code.

Figure 6:
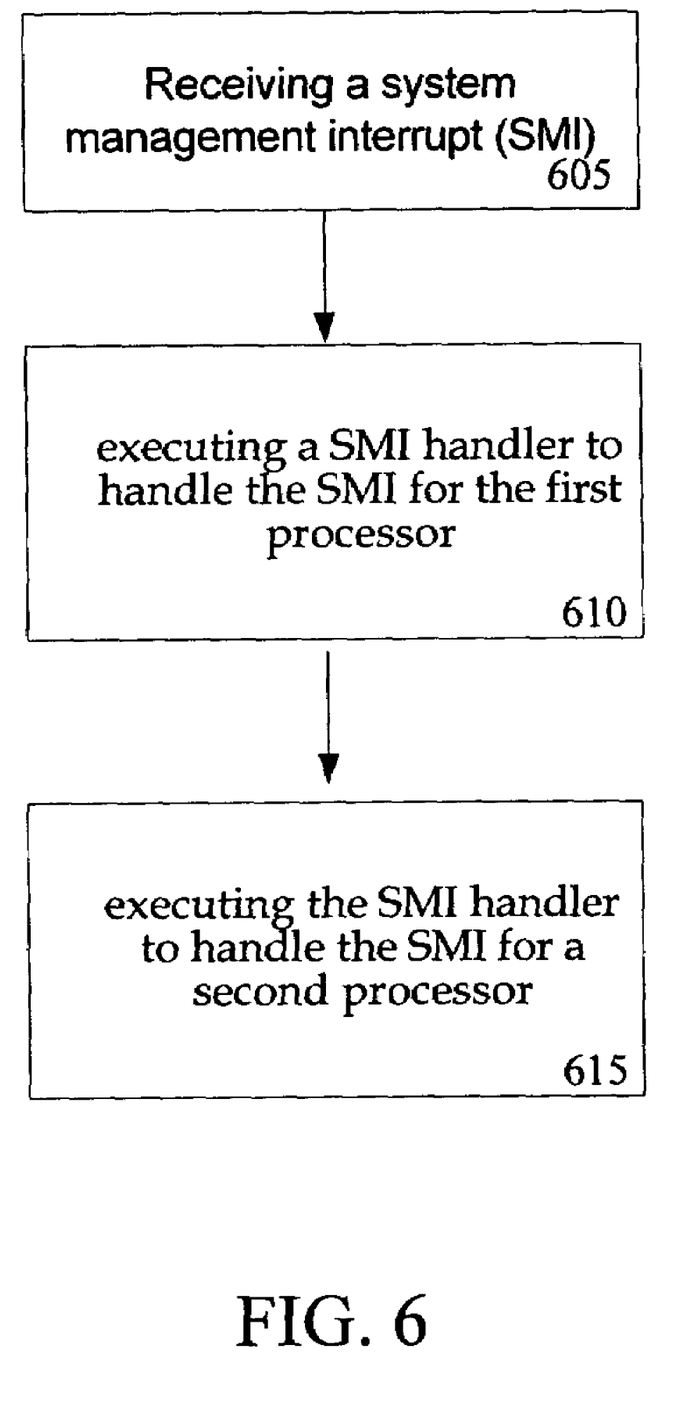
FIG. 6 illustrates a flow diagram of handling an SMI on a first and second processor with the same SMI handler.

Referring to FIG. 6, a method of handling and SMI whether upon boot or under normal operation, is described, wherein an SMI may be handled on multiple processors using the same SMI handler. In block 605, a SMI is received. SMIs may be either hardware (asynchronous), such as a battery being low, or software, such as the OS requesting a processor to change frequency or power levels. Typically, a hardware SMI may be handled by either processor without the knowledge of the other processor's save-state area. A software SMI, in contrast, often depends upon the architectural state of the processor when the SMI was generated thus requiring access to the save state area of the processor which generated the SMI. Therefore, a software generated SMI may have all the processor's in a multiprocessor system enter SMM and execute a handler.

In block 610, a first processor executes SMI code (an SMI handler) to handle the SMI for the first processor. Handling an SMI may include executing SMI code to determine if the current processor's save-state area being examined generated the SMI. Handling the SMI may also include servicing the SMI request.

As stated above in reference to FIG. 4, the first processor may have a first SMBase address. The SMI code (SMI handler) may be located at a default offset from the first SMBase address. Furthermore, the SMI code may reference a target SMBase address. The target SMBase may be the address where the SMI code targets to access that processor's system management area (range in memory).

As an illustrative example, the target SMBase may be set by default to reference a first SMBase address, which is the starting address of a first processor's system management area. Therefore, when an SMI is received and the SMI handler code is executed, the SMI handler code is able to access the first processor system management area, which may include the first processor's save-state area, by referencing off the target SMBase.

Figure 7:
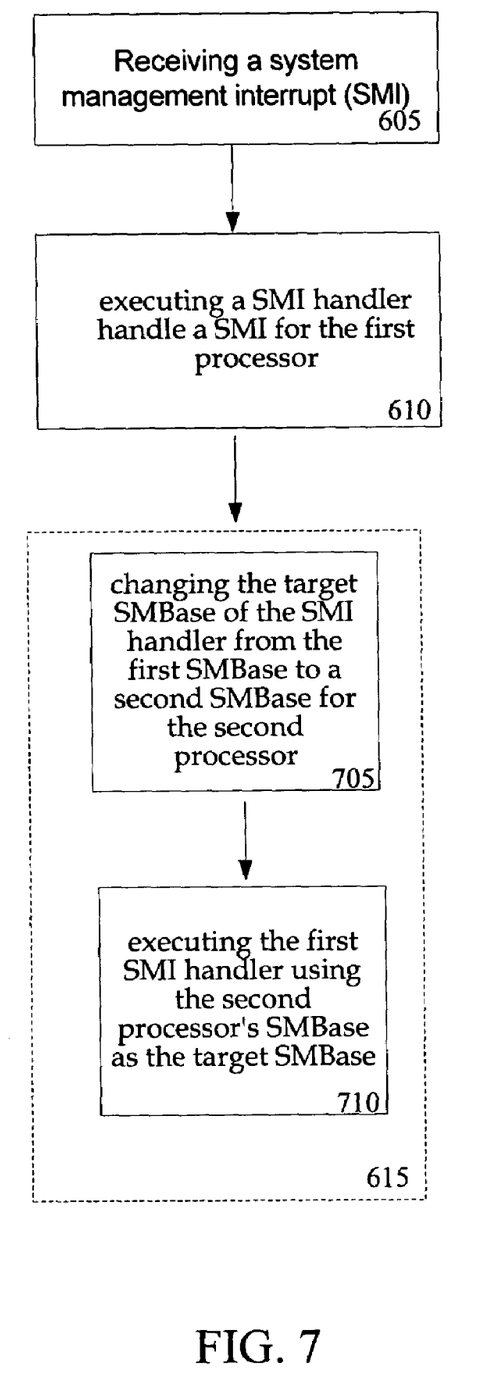
FIG. 7 depicts a flow diagram of an illustrative embodiment for handling an SMI on a first and second processor with one SMI handler.

After executing the SMI code in block 610 to handle the SMI for the first processor, the same SMI code/handler may be executed to handle the SMI for second processor, as shown in block 615. In FIG. 7, an illustrative embodiment of block 615, executing the SMI handler to handle the SMI for a second processor, is depicted in a flow diagram. In block 705, the target SMBase address of the SMI handler is changed from the first SMBase address for the first processor to a second SMBase address for the second processor.

Continuing the illustrative example from above, after executing the SMI handler code with the target SMBase targeting the first SMBase, the target SMBase may be changed to target the second SMBase address. The second SMBase address may be the starting address of the second processor's system management area (memory space). Therefore, when the SMI handler is executed using the second processor's SMBase as the target SMBase, as in block 710, the same SMI code/handler is able to handle the SMI for the second processor by referencing off the second processor's SMBase address.

Figure 8:
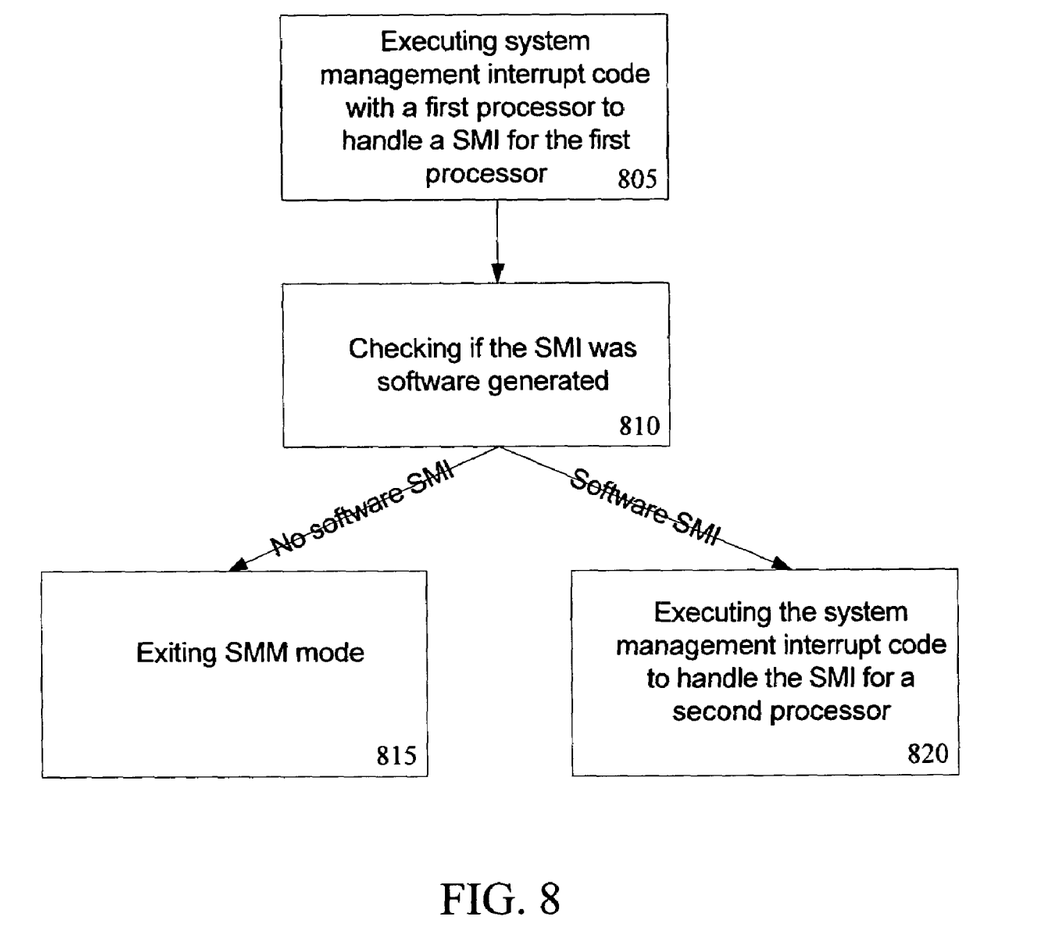
FIG. 8 illustrates a flow diagram for executing the same system management interrupt code one a first and second processor if the generated SMI is a software SMI.

FIG. 8 depicts another illustrative embodiment of executing the same SMI handler code for multiple processors, if the SMI being handled is software generated. As stated above, a hardware SMI may be handled by any processor without affecting the other processor. Therefore, in block 805, a first processor executes SMI code. In block 810, either the first processor or a second processor may check to see if the SMI is software generated. It is readily apparent that either processor may check to see if the SMI being handled is software generated in any temporal order. For example, the first processor may check to see if the SMI is software generated before block 805 and then execute SMI handler code in block 805. As another example, the second processor may check to see if a software generated SMI exists after block 805. If a software SMI does not exist, then the first processor exits SMM in block 815 and returns to normal operation.

However, if the SMI was software generated then the second processor should handle the SMI as well. In block 820, the second processor may then execute the same SMI code that first processor executed in block 805.

Figure 9:
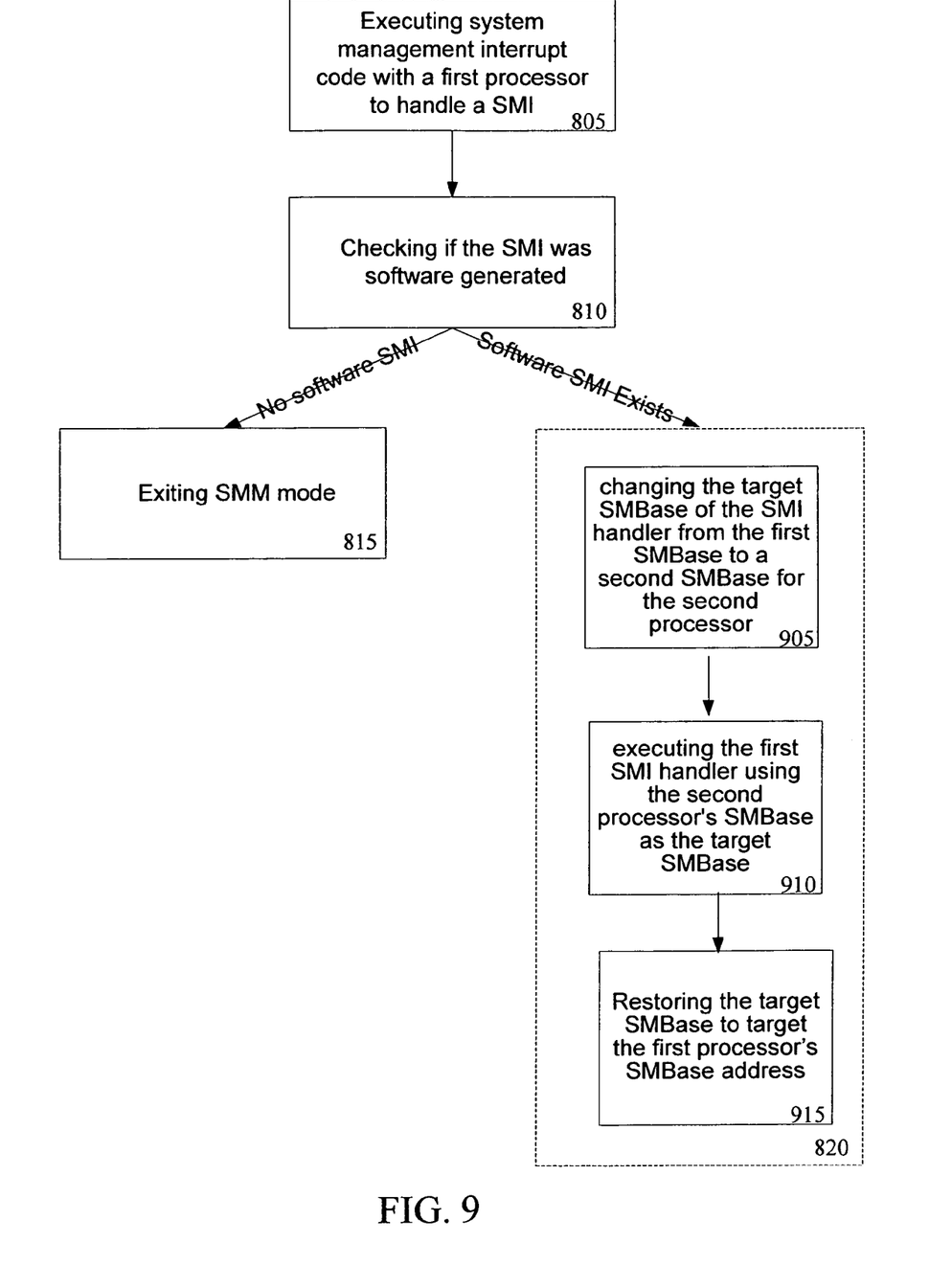
FIG. 9 depicts a flow diagram of an illustrative embodiment of a first and second processor executing the same SMI handler, if the SMI being handled was software generated.

An illustrative example of executing the same SMI code is depicted in FIG. 9 with a flow diagram. Much like FIGS. 6 and 7, the first processor's SMBase, which may be located at first memory location 365, may be the target SMBase address. After the SMI code is executed with the first processor to handle the SMI for the first processor, the target SMBase may be changed to target the second processor's SMBase address in block 905. In block 910, the SMI code is executed using the second processor's SMBase as the target SMBase. In addition, as shown in block 915, the target SMBase may be restored to targeting the first processor's SMBase address.

It is readily apparent that any combination of the first and second processor may execute the SMI code. For example, the first processor may execute the SMI code for the first processor. Then, after the target SMBase is changed to the second processor's SMBase, the first processor may execute the SMI code again to handle the SMI for the second processor. As another example, the second processor may execute the SMI code both times. As yet another example, the first processor may execute the SMI code the first time the SMI code is executed to handle the SMI for the first processor, and the second processor may execute the SMI code the second time to handle the SMI for the second processor.

Therefore, unlike current systems these optimizations may use only one SMI to be generated to wake and begin execution of a second processor. Furthermore, unlike traditional methods, which start each processor at a different default memory address, memory may be saved by sending a wake-up signal that starts the second processor at first memory address, which may be the location of a default SMI handler. Moreover, by patching the instruction pointer when the second processor handles the first SMI, the second processor may resume at a second memory address, which may be non-aligned. Allowing second processor to resume at second memory address saves the allocation of a separate aligned memory space for each processor.

In addition, handling an SMI may be done with a unified handler, by executing the same handler code with a first processor and then with a second processor. By checking to see if the SMI being handled was software generated and exiting SMM if the SMI was not software generated, one may save a significant amount of execution time. Furthermore, this implementation allows for easier platform development since all changes required for the software SMI handler may easily be contained in wrapper code without requiring modification to the software SMI handler routines.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving a first system management interrupt (SMI) with a first and a second processor;
   handling the first SMI with the first processor;
   generating a wake-up signal with the first processor after receiving the first SMI, wherein the wake-up signal references a first memory address of a default SMI handler;
   receiving the wake-up signal with the second processor;
   awakening the second processor, based on the wake-up signal from the first processor; and
   handling the first SMI with the second processor.

2. The method of claim 1, wherein the first and second processors are logical processors, and wherein the first logical processor includes a first thread and the second logical processor includes a second thread.

3. The method of claim 1, wherein the first and second processors are physical processors.

4. The method of claim 1, wherein handling the first SMI with a first processor comprises: executing the default SMI handler located at the first memory address.

5. The method of claim 4, wherein the wake-up signal is a startup inter processor interrupt (SIPI) signal.

6. The method of claim 5, wherein the first memory address is aligned.

7. The method of claim 6, wherein the first memory address is 4 k aligned.

8. The method of claim 5, wherein handling the first SMI with the second processor comprises executing the default SMI handler with the second processor.

9. The method of claim 8, wherein handling the first SMI with the second processor further comprises patching an instruction pointer to a second memory address.

10. The method of claim 9, wherein the second memory address is a non-aligned address.

11. The method of claim 10, further comprising: executing code at the second memory address after handling the first SMI with the second processor.

12. A method comprising:
    receiving a first system management interrupt (SMI);
    executing code at a first memory location with a first processor in response to the first SMI;
    generating a wake-up signal with the first processor;
    awakening a second processor, based on a wake-up signal from the first processor; and
    executing the code from the first memory location with the second processor, in response to the first SMI after awakening the second processor.

13. The method of claim 12, wherein the wake-up signal is based on the first memory location.

14. The method of claim 13, wherein the code at the first memory location is default SMI handling code.

15. The method of claim 14, wherein the first memory location is located in conventional memory.

16. The method of claim 15, wherein the first memory location is aligned.

17. The method of claim 12, wherein both the first and second processors are logical processors located on the same die.

18. The method of claim 12, wherein the first and second processors are physical processors located on separate packages.

19. The method of claim 12, further comprising patching an instruction pointer for the second processor to a second memory location.

20. The method of claim 19, wherein the second memory location is a non-aligned location.

21. The method of claim 20, further comprising:
executing code at the second memory location after patching the instruction pointer to the second memory location.

22. The method of claim 12, further comprising generating the SMI before receiving the first SMI.

23. The method of claim 22, wherein generating the SMI comprises changing the logic level of a pin coupled to a controller hub.

24. The method of claim 22, wherein an APIC is used to generate the SMI.

25. The method of claim 24, wherein the APIC is located in the first processor.

26. A method comprising:
executing system management interrupt (SMI) code with a first processor to handle a SMI for the first processor;
checking if the SMI is a software generated SMI; and
executing the SMI code to handle the SMI for a second processor, if the SMI is software generated.

27. The method of claim 26, wherein the first processor executes the SMI code to handle the SMI for the second processor, if the SMI is software generated.

28. The method of claim 26, wherein the second processor executes the SMI code to handle the SMI for the second processor, if the SMI is software generated.

29. The method of claim 26, wherein the first processor has a first system management base (SMBase) address.

30. The method of claim 29, wherein the second processor has a second SMBase address.

31. The method of claim 30, wherein said SMI code is located at first memory location, which has an offset from the first SMBase address.

32. The method of claim 31, wherein executing said SMI code to handle the SMI for the second processor comprises:
changing a target SMBase from the first SMBase to the second SMBase; and
executing the SMI code using the second SMBase as the target SMBase.

33. The method of claim 32, further comprising returning the target SMBase of the SMI handler to the first SMBase after executing the SMI code to handle the SMI for the second processor.

34. An apparatus comprising:
a controller to generate a first system management interrupt (SMI);
a first logical processor, coupled to the controller, to receive the first SMI, to handle the first SMI and to generate a wake-up signal after receiving the first SMI, wherein the wake-up signal references a first memory address of a default SMI handler; and
a second logical processor, coupled to the controller, to handle the first SMI after the wake-up signal is received from the first logical processor.

35. The apparatus of claim 34, wherein handling the first SMI with the first logical processor comprises executing the default SMI handler with the first logical processor.

36. The apparatus of claim 35, wherein the first memory address is 1 k aligned.

37. The apparatus of claim 35, wherein handling the first SMI with the second logical processor comprises executing the default SMI handler with the second logical processor.

38. The apparatus of claim 37, wherein handling the first SMI with the second logical processor further comprises patching an instruction pointer to a second memory address.

39. A system comprising:
a controller hub to generate a first system management interrupt (SMI);
a memory to hold code beginning at a first memory address;
a first processor coupled to the controller hub to receive the first SMI and to handle the first SMI, wherein the first processor is to execute the code beginning at the first memory address to handle the first SMI and is to generate a wake-up signal after receiving the first SMI; and
a second processor coupled to the controller hub to receive the first SMI, to be woken up in response to receiving the wake-up signal, and to handle the first SMI after receiving the wake-up signal, wherein the second processor is to execute the code beginning at the first memory address to handle the first SMI.

40. The system of claim 39, wherein the first and second processors are logical processors on the same die.

41. The system of claim 39, wherein the first and second processors are physical processors located on separate packages.

42. The system of claim 39, wherein a pin is toggled on the controller hub to generate the first SMI.

43. The system of claim 39, wherein boot code is executed by the controller hub to generate the first SMI.

44. The system of claim 39, wherein the code beginning at the first memory address includes SMI handling code.

45. The system of claim 44, wherein the wake-up signal includes a vector referencing the first memory address.

46. The system of claim 45, wherein handling the first SMI with the second processor after receiving the wake-up signal further comprises setting a pointer to a second memory address.

47. The system of claim 46, wherein the second processor, upon resuming from handling the SMI, executes code at the second memory address.

48. A system comprising:
a memory to hold system management interrupt (SMI) code beginning at a first memory address;
a first logical processor coupled to the memory to execute the SMI code beginning at the first memory address to handle an SMI for the first logical processor in response to receiving the SMI; and
a second logical processor coupled to the memory to execute the SMI code beginning at the first memory address to handle the SMI for the second logical processor in response to the SMI being software generated.

49. The system of claim 48, wherein the first logical processor is associated with a first system management base (SMBase) address.

50. The system of claim 49, wherein the second logical processor is associated with a second SMBase address.

51. The system of claim 50, wherein the first memory address has an offset from the first SMBase address.

52. The system of claim 51, wherein a target SMBase referenced by the SMI code, by default, is the first SMBase address.

53. The system of claim 52, wherein the target SMBase is changed to the second SMBase address before the second logical processor executes the SMI code.

* * * * *